United States Patent Office 3,188,363
Patented June 8, 1965

3,188,363
INHIBITORS OF PREMATURE GELATION IN POLYESTER RESINS
Roger W. Amidon, Woodbury, and Thomas H. Newby, Middlebury, Conn., assignors to United States Rubber Company, New York, N.Y., a corporation of New Jersey
No Drawing. Filed Sept. 13, 1961, Ser. No. 137,719
36 Claims. (Cl. 260—863)

This application is a continuation-in-part of application Serial No. 818,246, filed June 5, 1959, now abandoned.

This invention relates to the stabilization and controlled polymerization of alpha, beta-ethylenically unsaturated polyester compounds and more particularly this invention relates to compositions of alpha, beta-ethylenically unsaturated polyesters and ethylenically unsaturated monomeric compounds containing small amounts of a stabilizing promoter whereby copolymerization of the composition may be controlled. Further this invention relates to the preparation of stable compositions of polymerizable unsaturated polyester resinous compositions.

The prior art has recognized the problem of stabilizing polyester compounds having ethylenic unsaturation. The presence of catalyst impurities in the unsaturated polyester and exposure to the atmosphere causes premature gelation. The resin changes from a free flowing liquid to a jelly-like mass and is worthless in fabricating molded articles. Premature gelation constitutes an even more critical problem when an ethylenically unsaturated monomer is mixed with the unsaturated polyester. In such a case rapid reaction between the polyester and the unsaturated monomer occurs with the formation of polymerized and crosslinked gelatinous products. This problem is particularly actue since copolymers of unsaturated polyesters and ethylenically unsaturated monomers result in highly crosslinked gelled products which cannot be redissolved and are of no commercial value.

Heretofore the stabilization of compositions of ethylenically unsaturated polyesters or mixtures of polyesters with ethylenically unsaturated monomers has been attempted in a variety of ways. It has been proposed to prevent premature gelation of such compositions by incorporating alpha cellulose as a filler as shown in U.S. Patent 2,255,313. Further experimentation in this area indicated that the polymerization was caused through the generation of free radicals. Various phenolic compounds or quinones were proposed as stabilizers such as disclosed in U.S. Patent 2,409,633 since these compounds were known to react with free radicals and inhibit polymerization. Compounds of this type, which were effective to inhibit polymerization, were defective from the standpoint of continuing to inhibite polymerization even after catalyst was added and the mixture was heated. This unduly slowed up the reaction and necessitated an increase in the concentration of the polymerization catalyst to override the effect of the inhibitor. Furthermore such inhibitors often tended to discolor the resins, a feature highly objectionable in the casting art. It has also been suggested to use salts of amines, or quaternary ammonium, phosphonium, or arsonium salts. While these compounds have been effective in inhibiting premature gelation, frequently large amounts of the compounds are necessary and the period of stabilizing activity is limited. Moreover, it is necessary that stabilizing compounds do not inhibit polymerization of the resin compositions when free radical initiators are added to the resin to cause gelation and curing. Frequently, prior art compounds which have been highly effective as stabilizers have inhibited cure of the polyester resin and necessitated the addition of large and uneconomical amounts of promoters.

The conversion of unsaturated polyesters and ethylenically unsaturated polymerizable monomers, such as styrene, to form thermoset resins is well known in the art. Such conversion is generally carried out with free radical initiators. Generally peroxidic compounds are added to the resin to initiate polymerization with simultaneous application of heat. Heating causes the homolytic cleavage of the peroxidic material to yield free radicals which initiate polymerization of the resin. This polymerization reaction results in the crosslinking of the polyester and the consequent production of an infusible, insoluble resin. It has been shown by Hurdis in U.S. Patent 2,449,299 that benzoyl peroxide in the presence of certain nitrogen containing promoters, such as aromatic amines, decomposes at ambient temperatures to effect an essentially complete cure of polyester resins. This procedure eliminated the necessity for heating equipment theretofore necessary in curing resins. The use of promoters has increased the utility of polyester resins and has permitted the fabrication of large cast pieces. Since the issuance of U.S. Patent 2,449,299, similar results have been obtained with other promoter systems. These include such combinations as quaternary ammonium salts with hydroperoxides, and salts of cobalt with hydroperoxides or peroxides. Such promoters, however, have not given any notable stabilizing effect.

The plastics industry has long been in need of stabilizing compounds that would prevent premature gelation of polyester resin compositions but would not unduly protract the polymerization time of the resin when a free radical initiator was added. Compounds effective to impart stabilization also inhibited polymerization, and compounds giving enhanced promotion effect did not give stabilizing action.

It is therefore a primary object of this invention to provide a method for stabilizing alpha, beta ethylenically unsaturated polycarboxylic acid esters against premature gelation during relatively prolonged periods of storage.

It is a further object of this invention to provide a method for stabilizing mixtures of ethylenically unsaturated polyester compounds and ethylenically unsaturated monomeric compounds against premature gelation during extended periods of storage.

It is a still further object to provide stabilized ethylenically unsaturated polyester compounds which are highly resistant to gelation in the absence of peroxide catalysts but which resinify quickly at relatively low temperatures when such a catalyst is added.

It is a specific object of this invention to provide copolymerizable mixtures of ethylenically unsaturated polyesters and ethylenically unsaturated monomers which will cure readily to give resins having good color properties.

It is a further specific object to provide mixtures of ethylenically unsaturated polyesters and ethylenically unsaturated monomeric compounds which are free-flowing liquids and possess enhanced storage lives.

It is a more specific object to provide a method for polymerizing and copolymerizing mixtures of alpha, beta ethylenically unsaturated polyester compounds.

According to the present invention, an ethylenically unsaturated polyester resin composition may be stabilized against premature gelation for extended periods of time by adding small amounts of hydrazine addition salts in admixture with copper. Moreover this invention provides a method for polymerizing such polyester resin compositions wherein hydrazine addition salt-copper mixtures may be used in synergistic relationship with free radical initiating compounds as promoters of polymerization.

The stabilization of polymerizable unsaturated polyester compounds and mixtures thereof with ethylenically unsaturated monomers has heretofore been effected with hydrazine addition salts, such as shown in U.S. Patent 2,570,269. Additionally, in U.S. Patent 2,429,060, hydrazine and substituted hydrazine compounds and their salts are shown as auxiliary promoting agents for the polymerization of polyester compositions in the presence of a peroxide polymerization initiator. In accordance with this invention it has been found that hydrazine addition salts may be used in admixture with copper as excellent gelation promotion inhibitors and promotion stabilizers for alpha, beta ethylenically unsaturated polyesters or for mixtures of such polyesters and ethylenically unsaturated monomers. The hydrazine salts disclosed in U.S. Patent 2,429,060 and U.S. Patent 2,570,269 may be utilized in the process of this invention and are herein incorporated by reference. It has been found, however, that the free hydrazine compounds disclosed in U.S. Patent 2,429,060 are of lesser utility in the practice of this invention.

The polymerizable mixtures to be stabilized by the process of this invention are conventional classes of resins known in the prior art. These polyester resins are prepared by the esterification of alpha, beta unsaturated polybasic acids and dihydric alcohols. Certain compounds of this type may be indicated generically as follows:

where —M— represents an unsaturated dibasic acid residue and —G— represents a dihydric alcohol residue. Modifying dibasic acids may also be used in the polyester resin compositions. Representative dihydric alcohols and unsaturated polybasic acids are shown below.

In preparing polyesters which may be employed in the practice of the present invention, the alcohol component may comprise ethylene glycol, diethylene glycol or propylene glycol, or one of the group of solid polyethylene glycols designated as "Carbowax."

Polyethylene glycols such as the "Carbowaxes" are understood to have molecular weights above 300. Those most useful for this invention have weights below 4000 and preferably are in a range of about 1000 to 2000, e.g., 1500.

The acid component usually comprises an alpha, beta-ethylenically unsaturated polycarboxylic acid such as maleic, fumaric or itaconic acid, or the well-known derivatives of these polycarboxylic acids having ethylenic unsaturation in alpha-beta relation to the carboxyl group. Polybasic acids such as aconitic acid, tricarballylic acid or citric acid may also be employed. A plurality of such acids also may be mixed with each other, if so desired. In many instances, it may be desirable to include a dicarboxylic acid free of ethylenic unsaturation. Examples of this latter type of dicarboxylic acid include phthalic acid or terephthalic acid, which, although they contain double bonds in the benzene ring, do not undergo addition reaction with monomer compounds and may, therefore, be considered as being the equivalent of saturated compounds. Likewise, aliphatic dicarboxylic acids such as succinic acid, adipic acid, sebacic acid, or azelaic acid may be substituted for a part of the alpha, beta-ethylenically unsaturated dicarboxylic acid. The proportion of the non-ethylenic acid with respect to the alpha, beta-ethylenically unsaturated acid is susceptible of wide variation. A molecular proportion of 0.25 to 12 moles of saturated acid per mole of unsaturated acid is usually used for commercial applications.

In preparing the polyester, a small excess (usually 5 or 10 percent) of the dihydric alcohol is usually employed. The conditions of the esterification reaction are those conventionally employed in preparing polyesters. For example, the mixture of the alcohol and the acid is heated in a vented container or under an inert atmosphere until the water of reaction is expelled from the system, which usually occurs in a temperature range of about 150 to 200° C. The reaction is continued until water ceases to evolve or until the acid value is reduced to a reasonably low point, e.g., within a range of about 5 to 50, or until the mixture becomes highly viscous or even solid when it is cooled. Usually these conditions are attained in a period of 2 to 20 hours. In any event, the reaction is concluded before the product becomes infusible and insoluble because of the advanced stage of polymerization.

The ethylenically unsaturated monomers may be selected from the following general list:

(1) Monoolefinic hydrocarbons, that is, monomers containing only atoms of hydrogen and carbon, such as styrene, alpha-methyl styrene, alpha-ethyl styrene, alpha-butyl styrene and vinyl toluene, and the like;

(2) Halogenated monoolefinic hydrocarbons, that is, monomers containing carbon, hydrogen and one or more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 2,4,5-trichlorostyrene, dichloromonofluorostyrenes, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, and the like;

(3) Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate, methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate and dodecyl acrylate, isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chlorocarbonate, allyl formate, allyl acetate, allyl propionate, allyl butyrate, allyl valerate, allyl caproate, diallyl phthalate, diallyl succinate, diethylene glycol bis(allyl-carbonate), allyl 3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, diallyl-3,4,5,6,7,7-hexachloro-4-endomethylene tetrahydrophthalate, as well as methallyl esters corresponding to the above allyl esters, as well as esters from such alkenyl alcohols as beta-ethyl allyl alcohol, beta-propyl allyl alcohol, 1-buten-4-ol, 2-methyl-buten-1-ol-4, 2(2,2,-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, dimethallyl fumarate and diethyl glutaconate;

(4) Organic nitriles such as acrylonitrile, methacrylonitrile, ethacrylonitrile, crotonitrile, and the like;

(5) Acid monomers such as acrylic acid, methacrylic acid, crotonic acid, 3-butenoic acid, angelic acid, tiglic acid and the like;

(6) Amides such as acrylamide, alpha-methyl acrylamide, N-phenyl acrylamide, N-methyl, N-phenyl acrylamide, and the like.

The preferred monomers are liquid compounds soluble in the polyester component. They will contain the $$>C=CH_2$$ 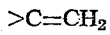

group and preferably the latter will be attached to a negative radical such as a benzene ring, a chlorine atom, an ester linkage, a nitrile group or the like. They should be free of carbon-carbon conjugated double bonds.

The monomer component or components may be employed over a relatively broad range, but, usually, the amount thereof upon a weight basis will be less than that of the polyester component. Usually, the percentage of monomer will fall within a range of about 10 to 45 or 50 percent by weight of the total mixture of polyester and monomer. The preferred range of monomer is about 20 to 40 percent, in most instances.

The novel inhibitors and stabilizers of this invention comprise a hydrazine addition salt in admixture with either a soluble copper compound, such as a copper salt, or trace amounts of copper. The hydrazine addition salts employed as one component of the above admixture are salts of symmetrically or unsymmetrically substituted hydrazine compounds and unsubstituted hydrazine salts. Substitution of the hydrazine molecule may be by alkyl, aliphatic, aromatic, aralkyl, araliphatic, cycloalkyl, or cycloaliphatic groups. The essential criterion in the selection of these salts is the presence of the >N—N< group. Preferably at least one of the above listed organic groups is attached to the >N—N< group. Also, the hydrazine addition salt may appropriately be an N-amino substituted heterocyclic compound wherein the hetero atom is nitrogen. Hydrazine addition salts may also be used wherein two or more >N—N< linkages are present in the same molecule, such as "dionium salts" etc.

Salt formation by the hydrazine compounds to form the hydrazine addition salts contemplated by this invention may be with any compound capable of ionizing or separating into positive and negative charged radicals, the positive radical of which is capable of forming a chemical bond with a basic nitrogen atom of the >N—N< group. Examples of such compounds include alkyl halides, and aliphatic and aromatic substituted alkyl halides. Mineral acid anions, other than halide, may also be used when substituted on the above organic groups. Also, organic acids and mineral acids may be used for salt formation. Generally it is desirable to utilize an organic acid having a dissociation constant at least that of acetic acid and generally it should not contain heavy radicals or groups that would unduly impair mobility of the acid in the mixture. The use of excessively heavy organic acids to form the salts may also unduly increase the amount of salt required to attain stability; therefore, organic acids employed are preferably of a molecular weight not above 200. Mineral acids are preferred for salt formation, particularly the non-oxidizing mineral acids. Organic substituted inorganic acids, such as the acid sulfonates, phosphonates, may also be used.

Hydrazine addition salts which are particularly effective in the novel mixtures of this invention are compounds of the following types:

(I) 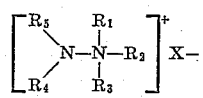

(II) 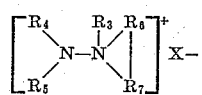

(III) 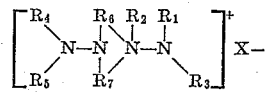

(IV) 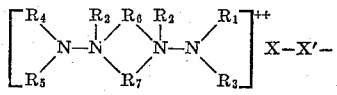

wherein $R_1$ is selected from the groups consisting of alkyl, aralkyl, aromatic, araliphatic radicals; $R_2$, $R_3$, $R_4$ and $R_5$ are selected from the group consisting of hydrogen, alkyl, aralkyl, aromatic, aliphatic araliphatic radicals and $R_6$ and $R_7$ are selected from the group consisting of alkylene and substituted alkylene radicals. X and X' are anionic radicals selected from the group consisting of organic and inorganic non-oxidizing acids having a dissociation constant of at least $1 \times 10^{-5}$. In addition, unsubstituted hydrazine salts of organic and inorganic non-oxidizing acids having a dissociation constant of at least $1 \times 10^{-5}$ are particularly effective.

Specific hydrazine addition salts which have been found to be particularly applicable in the process of the invention include among others 1-allyl-1, 1-dimethyl hydrazonium bromide, 1-allyl - 1,1 - dimethyl hydrazonium chloride, N,N'-diamino-N,N'-dimethyl piperazonium diiodide, 1,1,1,2-tetramethyl hydrazonium iodide, 1,1,1-trimethyl hydrazonium iodide, N-amino-N-benzyl piperidonium chloride, 1-benzyl-1, 1-dibutyl hydrazonium chloride, 1-benzyl-1,1-dimethyl hydrazonium bromide, 1-benzyl-1,1-dimethyl hydrazonium chloride, 1-benzyl - 1,1,2-trimethyl hydrazonium chloride, N,N'-diamino-N,N'-dibenzyl piperazonium dichloride, 1-benzyl - 1 - methyl-1-phenyl hydrazonium iodide, 1,1-dibenzyl-1,2-diphenyl hydrazonium chloride, 1,1-dibenzyl-1-phenyl hydrazonium chloride, 1,1-dimethyl-1,2-diphenyl hydrazonium iodide, 1,1-dimethyl-1-phenyl hydrazonium chloride, 1,1-dimethyl-1-phenyl hydrazonium iodide, N,N'-diamino-N,N'-dibenzyl piperazonium diiodide, N,N'-diamino N,N,N',N-tetramethyl butene-2-diammonium-1,4-dichloride, 1-benzyl-1-methyl-1-phenyl hydrazonium chloride, 1,1-dimethyl hydrazonium hydrochloride, 1,1-dibutyl hydrazonium hydrochloride, 1,1-dimethyl hydrazonium-p-toluene sulfonate, 1,1-dimethyl hydrazonium benzene phosphonate, 1,1-dimethyl hydrazonium oxalate, 1,1-dimethyl hydrazonium dichloroacetate, phenyl hydrazine hydrochloride, 1,1-dimethyl-1-undecyl hydrazonium bromide, 1,1- dimethyl-1-undecyl hydrazonium chloride, 1,1-dimethyl-1-dodecyl hydrazonium bromide, 1,1-dimethyl-1-dodecyl hydrazonium chloride, 1,1-dimethyl - 2 - dodecyl hydrazonium chloride, 1,1-dimethyl-1-hexadecyl hydrazonium bromide, 1,1-dimethyl-1-hexadecyl hydrazonium chloride, 1,1-dimethyl-1-octadecyl hydrazonium chloride, 1,1-dimethyl-1-dodecyl hydrazonium chloride, 1,1-dimethyl-1-(α-naphthyl) hydrazonium chloride, β-naphthyl hydrazine hydrochloride, 9 - anthrocene hydrazine hydrobromide, 1,1-dimethyl-1-(2-phenyl ethyl) hydrazonium chloride, 1,1-ethyl-1-hexadecyl-1-methyl hydrazonium chloride, 1-allyl-1-hexadecyl-1-methyl hydrazonium chloride, 1,1-di-i-amyl-1-hexadecyl hydrazonium chloride, 1,1,1-trihexadecyl hydrazonium chloride, 1-methyl-1,1-bis-(2-methylhexadecyl) hydrazonium chloride, 1,1 - diethyl-1-(7-octadecenyl) hydrazonium chloride, 1-decyl-1-ethyl-1-octadecyl hydrazonium chloride, 1-ethyl-1-bis-(7,10-octadecadienyl) hydrazonium chloride, 1,1,1-trioctadecyl hydrazonium chloride, 1,1-dimethyl-1 - nonadecyl hydrazonium chloride, 1-methyl-1-nonadecyl-1-undecyl hydrazonium chloride, 1,1-dimethyl-1-(2,4,4,6,6,8,8-heptamethylnonyl-2) hydrazonium chloride, 1,1-diethyl-1-eicosyl hydrazonium chloride, 1,1-dimethyl-1-(4,6,8,10,12,14-hexamethylpentadecyl-2) hydrazonium chloride, 1,1-diethyl-1-brassidyl hydrazonium chloride, 1,1-diethyl-1-erucyl hydrazonium chloride, 1,1-dimethyl-1 - (2,4,4,6,6,8,8,10,10,12,12-undecamethyltridecyl-2-) hydrazonium chloride, 1,1-di-n-propyl-1-tetracosanyl hydrazonium chloride, 1,1,1-tri-n-hexyl hydrazonium chloride, 1-methyl-1,1-dioctadecyl hydrazonium chloride, 1-methyl-1,1-dioctadecyl hydrazonium bromide, hydrazine hydrochloride and hydrazine dihydrochloride. The concentration of hydrazine addition salts which may be used in the promoter-stabilizer mixtures of this invention will vary over a wide range depending on the particular hydrazine addition salt which is used.

The nature of the polyester resin composition and the concentration of copper in admixture with the hydrazine addition salt will determine the concentration of the hydrazine addition salt which will produce optimum results. A broad concentration range of about .1 to about 10,000 parts of hydrazine addition salt per million parts of resin composition may be used in the novel mixtures of this invention. A preferred range of concentration is from about 10 to 5,000 parts per million. A still more preferred range for obtaining the optimum results of this invention is from about 25 to about 3,000 parts per million. These ranges may be modified above or below the above indicated values depending on variations obtained in using different substituted hydrazine addition salts, different polyester resin compositions and varying concentrations of copper. The nature of the hydrazine substituent groups and the particular anionic group in the addition salt have a pronounced effect on the color properties of the resin composition. Aromatic substituted hydrazines usually impart coloration to the resin. Similarly coloration is obtained when iodide salts of hydrazines are used as stabilizers. If coloration is objectionable in the polyester resin, then lower concentrations of the hydrazine addition salt causing coloration will necessarily have to be employed, whereas if color is acceptable then higher concentrations may be used.

Copper which forms the other ingredient of the promoter-stabilizer can be used in a variety of chemical combinations. The copper can be either an organic salt or an inorganic salt and be either in the cuprous (copper (I)) or the cupric (copper (II)) oxidation state. Preferably the salt is dissolved in the polyester composition, although it has been found that copper existing in a heterogeneous phase relationship, which results when copper or insoluble copper salts are employed in admixture with the hydrazonium salts, displays some synergistic action. This may be due in part to the solubilizing effect of the acid groups in the polyester resin. It has been found, however, to be more desirable to employ a copper compound which is soluble in the polyester composition. In some cases where the copper compound is not soluble in the same solvent used for the hydrazonium salt, a different solvent miscible with the first solvent, may be used to solubilize the copper compound. In still other cases, the copper compound may be solubilized through complex formation. Examples of suitable copper salts which may be employed in the process of this invention include cupric acetate, cupric arsenate, cupric benzoate, cupric carbonate, cupric chloride, cupric bromide, cupric fluoride, cuperic oleate, cupric sulfate, cupric nitrate, cupric laurate, cupric citrate, cupric salicylate, copper (II) salt of 8-hydroxy-quinoline, copper (II) salt of 3-phenyl salicyclic acid, cupric benzenesulfonate, cupric ethylene-diamine triacetate, cuprous bromide, cuprous carbonate, cuprous chloride, cuprous iodide, cuprous sulfate, copper naphthenate, copper pelargonate, copper octoate and the like. The concentration of soluble copper or copper which may be solubilized in the reaction mixture may be varied over a wide range depending on the particular polyester resin composition which is being stabilized. The nature and concentration of the hydrazine addition salt which is used in admixture with the copper will determine the optimum concentration of copper which may be used in the reaction mixture. Higher concentrations of copper generally result in more colored polyester resins than if lower concentrations are used. The concentration of copper may be varied to give different color properties to the resin. It is commercially desirable to produce colorless resins and usually lower concentrations of copper will be preferred. Generally a range of from about .1 part to about 800 parts of copper per million parts of polyester resin may be used in obtaining the results of this invention. A more preferred concentration range of copper for stabilizing polyester resin compositions is from about .25 part to about 300 parts per million. A still more preferred range of copper concentration for obtaining the optimum results of this invention is from about .5 part to about 10 parts per million.

The prior art has shown that large amounts of copper in a polyester resin affects the ultimate cure and the rate at which this is achieved. Though there is no sharp point of definition, copper ion in excess of about 20 to 50 parts per million reduces the heat of polymerization as manifested in the maximum temperature reached during a curing operation. Furthermore the cure will be extended over a longer period of time following the point of gelation. This effect may be desirable where a slow cure provides a slow rate of shrinkage which would in turn yield a manufactured article relatively free of strain. When an article prepared from a polyester resin is reinforced with glass fiber or asbestos, a strain free part may not be required. In this case, a more rapid cure could be used which would suggest the use of trace amounts of copper ion.

It will be appreciated that the above ranges are generally effective in producing the results of this invention; however, concentrations above or below these ranges may be used in particular resin compositions to produce the variations indicated above.

In some cases, other metallic salts or organometallic compounds may advantageously be used in conjunction with the hydrazonium salts disclosed in this invention; however, it has been found that the results obtained are inferior to those observed with copper. Cobalt and iron salts have been found to exhibit some synergistic effect when used in connection with the hydrazine addition salts. These salts generally effect stabilization and inhibition of premature gelation of the polyester resins for periods of time which are one-tenth to one-fifth of those observed with copper. Manganous, cerium, mercury, lead, calcium, nickel, chromium, zirconium and zinc salts have little synergistic action with hydrazine addition salts. Cobalt salts have been observed to give enhanced promotion effects similar to those observed with copper, but cobalt is unique among the other metals in this aspect.

Mixtures of copper and hydrazine addition salts may also be used as promotors for polyester resin compositions. Generally the quantities specified for inhibiting the polymerization of these mixtures are useful in serving as auxiliary agents or promoters of polymerization in the presence of known polymerization catalysts. Appropriate polymerization catalysts include peroxides such as tertiary butyl hydroperoxide, cyclohexyl hydroperoxide, methyl ethyl ketone peroxide and cumene hydroperoxide. Polymerization is usually carried out with catalysts in amounts of .1 to 5% based on the weight of the resin composition at temperatures in the range of 25–100° C., although temperatures above or below this range may be employed depending on the time of heating, on the amount of the stabilizer promoter of copper and hydrazine addition salt, and on the nature of the polyester resin composition. After the resins have set, they may be rendered harder and more durable by baking at a temperature of about 125 to about 150° C. Ordinarily, temperatures above 150° C. are to be avoided since they tend to char or discolor the product.

Inhibitors, stabilizers and promoters heretofore used by the prior art may in some cases advantageously be used with the novel stabilizer-promoters of this invention. In combination, the hydrazine addition salt-copper mixtures are used in substantially the concentration ranges set forth above. The prior art compounds are added in concentrations of from about 0.01 to 5 parts of such compounds per 1 part of the mixture of hydrazonium salt and copper salt. Preferably the preparation should be limited to .1–1.0 part per 1 part. It is desirable to use the persistent and powerful inhibitors of the quinone and phenolic type at the lower limits of this range since these compounds tend to exert a very strong retarding effect on the polymerization or interpolymerization of the polyester resin compositions even after free radical initiators are added. Amine salts and quaternary ammonium salts such as shown in U.S. Patent 2,646,416 and U.S. Patent 2,593,787, the disclosures of which are herein incorporated by reference, do not display the powerful polymerization retarding effects of the quinonic type compounds and may be used in quantities toward the high side of the range set forth above. The particular promoter-stabilizer combination used in promoting gelation in the presence of a free radical initiator will largely be dependent upon gel time. If long gel times are desirable, such as when casting boat hulls, larger amounts of hydroquinone may be used than the quantities indicated above. If a quicker gel time is required such as in polyester resin putties, then smaller quantities of hydroquinone or quinonic stabilizers should be used, preferably in the range set forth above.

Inasmuch as the presence of the free radical polymerization initiator in the material would cause a spontaneous cure, it is necessary that the initiator not be introduced into the composition until just prior to its cure. Alternative methods of introducing the promoters into the polymerizable mixture will be apparent to those skilled in the art. For example, the copper salt may be dissolved in the polymerizable mixture and the hydrazine addition salt introduced therein in a suitable solvent. Alternatively, both components of the promoter system may be introduced into the polymerizable mixture during the formulation of the resinous composition and the cure of the material then effected by the introduction of a suitable free radical initiator therein.

Application of the principles of the invention are illustrated by the following examples. Unless otherwise indicated, all quantities are expressed in parts by weight.

PREPARATION OF POLYESTER

The preparation of polyester resin compositions which may be used in connection with the stabilizers or promoters of this invention is described below.

Example 1

A mixture of 840 parts of diethylene glycol, 159 parts of ethylene glycol, 592 parts of phthalic anhydride and 588 parts of maleic anhydride was added to a reaction flask equipped with mechanical stirrer, thermometer and a Dean-Stark water trap. The reaction mixture was kept under an atmosphere of carbon dioxide during the entire course of the reaction. Following the addition of the mixture to the flask, the mixture was heated to mobility at which time stirring was commenced. At a temperature of 205° C., the mixture became homogeneous and started to esterify as manifested by the distillation of water. After heating for 3.5 hours at 200–210° C., the polyester had an acid number of less than 40 and was cooled to 100° C. and removed from the flask.

Example 2

A polyester resin composition was made by mixing 10.88 parts of phthalic anhydride and 7.21 parts of maleic anhydride with 11.20 parts of propylene glycol and .57 part of ethylene glycol. The mixture was esterified at 200–210° C. to an acid number of 50.

Example 3

A dipropylene glycol-maleic anhydride polyester resin was made by adding 17.45 parts of dipropylene glycol to 12.50 parts of maleic anhydride. The mixture was esterified at 205–210° C. to obtain a resin with an acid number of 25.

Example 4

A polyester resin was prepared by esterifying 13.4 parts of diethylene glycol, 2.94 parts of maleic anhydride and 13.15 parts of adipic acid at 205–210° C. in the presence of .00416 part of hydroquinone until an acid number of 30 was reached.

The cooled polyester was converted to a liquid resin by the addition of 24.8 parts of styrene which contained .00136 part of hydroquinone and copper naphthenate sufficient to yield a concentration of one part per million of copper based on the finished resin.

Example 5

A polyester was prepared from 116 parts of fumaric acid, 134 parts of dipropylene glycol, and 151 parts of wood rosin. The mixture was esterified by heating at 200° C. to 240° C. until an acid number below 100 was obtained.

PREPARATION OF HYDRAZINE ADDITION SALTS

The preparation of illustrative hydrazonium addition salts which may be utilized in the process of this invention is indicated below.

Example 6

The preparation of 1-allyl-1,1-dimethyl hydrazonium bromide was carried out by adding a solution of 12.1 g. (0.1 M) of allyl bromide in 20 ml. of dioxane to 6.0 g. (0.1 M) of 1,1-dimethyl hydrazine in 10 ml. of dioxane. An exothermic reaction took place resulting in the precipitation of an oil which did not crystallize even after standing 24 hours. The oil was separated and placed in an evacuated desiccator after gentle warming. When the major portion of the solvent had been removed the oil weighed 19 grams. The solvated salt was completely soluble in water.

Example 7

The preparation of 1-allyl-1,1-dimethyl hydrazonium chloride was carried out by adding a solution of 7.65 g.

(0.1 M) of allyl chloride in 20 ml. of dioxane to 6.0 g. of 1,1-dimethyl hydrazine in 10 ml. of dioxane. No reaction was manifest until the solution was warmed to 60° C. whereupon the reaction was self-sustaining and an oil separated. When the temperature decreased to 50° C., the oil was seeded resulting in crystallization of 1-allyl-1,1-dimethyl hydrazonium chloride. The product was filtered and washed with acetone. A white crystalline product was obtained in nearly quantitative yield. After a short period the material tended to become a liquid suspension of crystalline material with an orange color.

*Example 8*

The preparation of N-amino-N-benzyl piperidonium chloride was carried out by heating a mixture of 2.53 g. (0.02 M) of benzyl chloride and 2.0 g. (0.02 M) of N-amino piperidine in 20 ml. of dioxane. At 50° C. a crystalline precipitate was formed. The mixture was allowed to stand twenty hours and the crystals were removed by filtration. The product was washed with dioxane followed by acetone and dried. The yield was 2.25 grams. Recrystallization from dioxane-ethanol mixture yielded a product with a melting point of 156–157.5° C.

*Example 9*

The preparation of 1-benzyl-1,1-dibutyl hydrazonium chloride was carried out by adding a solution of 12.6 g. (0.1 M) of benzyl chloride in 50 ml. of dioxane to 14.4 g. (0.1 M) of 1,1-dibutyl hydrazine in 100 ml. of dioxane. The solution was warmed at 105° C. for two hours and then cooled to 10° C. A crystalline product separated which was removed by filtration and washed with 15 ml. of chilled dioxane and 15 ml. of chilled ether. The salt was dried in an air circulating oven at 55° C. The yield was 10 grams.

Recrystallization from dimethyl formamide and washing with acetone yielded a white product with a melting point of 196.5–198° C.

*Example 10*

The preparation of 1-benzyl-1,1-dimethyl hydrazonium bromide was carried out by the addition of 17.1 g. (0.1 M) of benzyl bromide to 6.0 g. (0.1 M) of 1,1-dimethyl hydrazine in 70 ml. of dioxane. Copious crystallization of the salt was obtained with marked exothermic behavior. The crystalline mixture was washed with dioxane followed by acetone. After drying the product weighed 23 grams. Purification by recrystallization from ethanol gave cream colored crystals with a melting point of 147–149° C.

*Example 11*

The preparation of 1-benzyl-1,1-dimethyl hydrazonium chloride was carried out by adding a solution of 380 g. of commercial benzyl chloride in 400 ml. of isopropyl acetate to a solution of 180 g. of commercial 1,1-dimethyl hydrazine in 1000 ml. of isopropyl acetate in a 3-liter, 3-necked flask equipped with stirrer, reflux condenser, dropping funnel and thermometer. The addition was carried out over a one-hour period. The temperature rose to 59° C. within 45 minutes and a cooling bath was applied to maintain the temperature at 50–60° C. This temperature was maintained for a little over one hour and the heating was then increased until the solvent boiled. Reflux was maintained for one hour and twenty minutes whereupon the crystalline suspension was allowed to cool.

When the reaction mixture had cooled to 20° C., the product was removed by filtration and washed with 300 ml. of isopropyl acetate to yield a cream colored crystalline material. The yield was 516 grams which is 94% of theory. The melting point of the crude crystalline material was 110–113° C.

Recrystallization from dimethyl formamide and washing with acetone yielded white crystals with a melting point of 146.5–148.5° C.

*Example 12*

The preparation of 1-benzyl-1-methyl-1-phenyl hydrazonium chloride was carried out by warming a solution of 6.1 g. (0.05 M) of 1-methyl-1-phenyl hydrazine and 6.3 g. (0.05 M) of benzyl chloride in 10 ml. of dioxane at 100° C. for one hour. Copious crystallization took place soon after warming. The product was removed by filtration and washed with dioxane. The yield was 4 grams. A melting point of 159–160° C. was obtained for the crystalline salt.

*Example 13*

The preparation of 1-benzyl-1,1,2-trimethyl hydrazonium chloride was carried out by adding 7.4 g. (0.1 M) of 1,1,2-trimethyl hydrazine in dioxane to 12.65 g. (0.1 M) of benzyl chloride in 10 ml. of dioxane. Immediate reaction resulted in the separation of an oil which congealed to a crystalline paste after sixteen hours at ambient temperature. The solid was removed and triturated with acetone to yield 11 grams of cream colored crystals.

The product was purified by recrystallization from dimethyl formamide and washed with acetone. A white crystalline product was obtained which melted at 121–123.5° C.

*Example 14*

The preparation of N,N'-diamino-N,N'-dibenzyl piperazonium dichloride was carried out by adding a solution of 2.9 g. (0.025 M) of 1,4-diaminopiperazine to 6.3 g. (0.05 M) of benzyl chloride in 100 ml. of ether and 20 ml. dioxane and the mixture was warmed to 60° C. Reaction was manifested by cloudiness but no crystals separated. The mixture was evaporated on the steam bath until a tough resinous solid was obtained. This was triturated with ether whereupon the resinous material was dissolved and a powder obtained which was removed by filtration. The yield was 6.5 grams.

The material was purified by recrystallization from ethanol to yield a white salt which melted at 245° C. with decomposition.

*Example 15*

The preparation of N,N'-diamino-N,N'-dimethyl piperazonium diiodide was carried out by mixing 2.2 g. (0.019 M) of 1,4-diaminopiperazine in 50 ml. of dioxane with 5.4 g. (0.038 M) of methyl iodide. An oil separated immediately on mixing. The oil thickened on standing and crystallization took place. The solid was removed by triturating in methanol and filtering.

The crystalline solid was further purified by suspending in hot methanol and adding sufficient water to effect solution. Chilling the solution yielded cream colored crystals which decomposed slowly on a hot stage at 120–185° C.

*Example 16*

The preparation of N,N'-diamino-N,N,N',N'-tetramethyl butene-2-diammonium-1,4 dichloride was carried out by adding a solution of 12.5 g. (0.1 M) of 1,4 dichlorobutene-2 in 50 ml. of methanol to 12 g. (0.2 M) of 1,1-dimethyl hydrazine in 50 ml. of methanol. An exothermic reaction took place. The solution was cooled and seeded to effect crystallization. The mixture was heated to 60° C. and sufficient methanol was added (300 ml.) to bring about complete solution of the formed salt. An additional 6.0 g. (0.1 M) of dimethyl hydrazine was added and the temperature maintained at 60–65° C. for 1.5 hours. The solution was then chilled to 10° C. and the crystalline product separated by filtration. The yield was 18 grams. Recrystallization from methanol yielded a product with a melting point of 245–250° C. with decomposition.

Example 17

The preparation of 1,1-dibenzyl-1,2-diphenyl hydrazonium chloride was carried out by heating a solution of 4.6 g. (.025 M) of hydrazobenzene and 6.4 g. of benzyl chloride in 50 ml. of dioxane on a water bath for 4.5 hours. The mixture was allowed to stand at ambient temperature for 48 hours. A tan colored solid was obtained which was removed and washed with ether.

Example 18

The preparation of 1,1-dibenzyl-1-phenyl hydrazoniumchloride was carried out by adding a mixture of 4.4 g. of 1-benzyl-1-phenyl hydrazine to 2.9 g. of benzyl chloride and heating to 130° C. The mixture was allowed to stand for 14 hours during which time crystallization took place. The solid was then removed by filtration and triturated with acetone and ethanol. White plates of 1,1-dibenzyl-1-phenyl hydrazonium chloride were obtained which sublimed above 230° C.

USE OF MIXTURES OF HYDRAZINE ADDITION SALTS AND COPPER SALTS AS STABILIZERS FOR POLYESTER RESIN COMPOSITIONS

Evaluation of the inhibiting properties of mixtures of hydrazine addition salts and copper salts in polyester compositions was made at a temperature of 70° C. in order to facilitate rapid evaluation, and accelerate gelation time. Results obtained at this temperature may be qualitatively compared with one another. Average storage life at room temperatures or 25° C., of course, will be many times longer than the values recorded at 70° C.

Gelation times for the stabilized compositions of this invention were determined by warming a measured amount of polyester to 110° C. and adding a solution of a copper salt. When the polyester cooled to 105° C., the hydrazine addition salt was added in either methanol or water solution to achieve the desired concentration in the resin. The polyester was allowed to cool to 100° C. at which temperature a measured amount of ethylenically unsaturated monomer was added. The time of this addition was taken as time zero. The inhibited resin was then placed in an oven at 70° C. and checked periodically to observe behavior. Gel time as recorded indicates the time at which the resin was last observed to be fluid. Generally, in all examples, copper solution was added at 110° C., inhibitor at 105° C. and ethylenically unsaturated monomer at 100° C.

Example 19

Thirty-five grams of the polyester prepared in Example 1 was warmed to 100° C. at which time 15 grams of a styrene monomer were added. The resulting mixture was then placed in an oven at 70° C. After 5 minutes had elapsed, the mixture began to gel with loss of fluidity.

Example 20

Thirty-five grams of the polyester prepared in Example 1 was warmed to 110° C. and 6.25×10⁻⁴ gram of a copper naphthenate salt solution containing 8% copper was added to give one part of dissolved copper per million parts by weight of the polyester. After completion of the addition and stirring, the mixture was cooled to 100° C. and 15 grams of a styrene monomer were added. The resulting resin was then placed in an oven at 70° C. Gelling was observed after 19 minutes.

Example 21

Thirty-five grams of the polyester prepared in Example 1 was warmed to 105° C. and 0.2 gram of 20% aqueous solution of 1-allyl-1,1-dimethyl hydrazonium chloride was added. The mixture was then cooled to 100° C. and 15 grams of a styrene monomer were added. The polyester resin composition was then placed in an oven at 70° C. After one hour and forty minutes, gelation was observed to occur.

Example 22

Thirty-five grams of the polyester prepared in Example 1 was heated to 110° C. and a solution of $6.25 \times 10^{-4}$ gram of a copper naphthenate in toluene containing 8% copper was added to give one part of dissolved copper per million parts by weight of the polyester. The polyester was then cooled to 105° C. and 0.2 gram of a 20% aqueous solution of 1-allyl-1,1-dimethyl hydrazonium chloride was added. The mixture was then allowed to cool to 100° C. and 15 grams of a styrene monomer were added. The polyester resin composition was then placed in an oven at 70° C. Gelation was not observed for more than 24 hours. This represents an increase in stability of more than 14 times that observed when 1-allyl-1,1-dimethyl hydrazonium chloride is used alone without added copper and more than 70 times that observed when stabilization was effected solely by added copper in the absence of any hydrazine addition salt. Moreover the stabilization effected by the mixture of this example represents an increase in gelling time of more than 280 times that of the unstabilized resin. The results of Examples 19–23 are tabulated in Table I.

TABLE I

| Inhibitor (at 800 p.p.m. of resin) | Copper concentration (p.p.m.) | Gel time |
|---|---|---|
| None | 0 | 5 min. |
| Do | 1 | 19 min. |
| 1-allyl-1,1-dimethyl hydrazonium chloride | 0 | 1 hour 40 min. |
| Do | 1 | 24 hours +. |
| 1-benzyl-1,1-dimethyl hydrazonium chloride | 0 | 1 hour 45 min. |
| Do | 1 | 11 hrs. 20 min. |

Example 23

The process of Example 22 was repeated using the hydrazine addition salt, 1-benzyl-1,1-dimethyl hydrazonium chloride. The results are summarized in Table I. The 1-benzyl-1,1-dimethyl hydrazonium chloride-copper stabilizing mixture gave an increased gel time nearly 7 times greater than when 1-benzyl-1,1-dimethyl hydrazonium chloride is used as a stabilizer in the absence of added copper.

Example 24

The procedure of Example 22 was repeated using 0.05 gram of N,N'-diamino-N,N'-dibenzyl piperazonium diiodide, representing a concentration of 800 parts of hydrazonium salt per million parts by weight of polyester resin. Gelation of the polyester resin was not observed until after more than 264 hours. This represents a period of stability of more than 5000 times that of the unstabilized resin and more than 1500 times that of resin to which only a copper salt was added.

Example 25

The procedure of Example 22 was repeated using 0.01 gram of 1,1-dibenzyl-1,2-diphenyl hydrazonium chloride representing a concentration of 200 parts of hydrazonium salt per million parts by weight of the polyester resin. Gelation of the polyester resin composition did not occur until after more than seven hours.

Example 26

The procedure of Example 22 was repeated using 0.0338 gram of 1,1-dibenzyl-1-phenyl hydrazonium chloride representing a concentration of 675 parts of hydrazonium salt per million parts by weight of the polyester resin. Gelation of the polyester resin did not occur until after more than 41 hours.

Example 27

The procedure of Example 22 was repeated using 0.04 gram of 1,1-dimethyl-1-phenyl hydrazonium iodide representing a concentration of 800 parts of hydrazonium salt per million parts by weight of the polyester resin. Gelation of the polyester resin did not occur until after more than 264 hours.

*Example 28*

The procedure of Example 22 was repeated using different hydrazine addition salt-copper salt mixtures. The hydrazine addition salt was used in concentrations of 400 parts per million parts of polyester resin except where noted otherwise. The results are summarized in Table II.

TABLE II

[Comparative effect of 400 p.p.m. of hydrazonium salts on premature gelation of a polyester resin]

| Salt | Copper conc. (p.p.m.) | Gel time |
| --- | --- | --- |
| None | 0 | 5 min. |
| Do | 1 | 19 min. |
| 1-allyl-1,1-dimethyl hydrazonium bromide | 1 | 2.5 hours. |
| 1-allyl-1,1-dimethyl hydrazonium chloride | 1 | 19 hours. |
| N,N'-diamino-N,N'-dimethyl piperazonium diiodide. | 1 | 78 hours. |
| 1,1,1,2-tetramethyl hydrazonium iodide | 1 | 54 hours. |
| 1,1,1-trimethyl hydrazonium iodide | 1 | 93 hours. |
| N-amino-N-benzyl piperidonium chloride | 1 | 11 hours. |
| 1-benzyl-1,1-dibutyl hydrazonium chloride | 1 | 4 hours. |
| 1-benzyl-1,1-dimethyl hydrazonium bromide | 1 | 1.5 hours. |
| 1-benzyl-1,1-dimethyl hydrazonium chloride | 1 | 4 hours. |
| 1-benzyl-1,1,2-trimethyl hydrazonium chloride | 1 | 1.5 hours. |
| N,N'-diamino-N,N'-dibenzyl pepirazonium dichloride. | 1 | 12.5 hours. |
| 1-benzyl-1-methyl-1-phenyl hydrazonium iodide | 1 | 50.5 hours. |
| 1,1-dibenzyl-1,2-diphenyl hydrazonium chloride | 1 | 7 hours.[1] |
| 1,1-dibenzyl-1-phenyl hydrazonium chloride | 1 | 41 hours.[2] |
| 1,1-dimethyl-1,2-diphenyl hydrazonium iodide | 1 | 50.5 hours. |
| 1,1-dimethyl-1-phenyl hydrazonium chloride | 1 | 3 hours. |
| 1,1-dimethyl-1-phenyl hydrazonium iodide | 1 | 42 hours. |

[1] At 200 p.p.m. of hydrazine addition salt stabilizer.
[2] At 675 p.p.m. of hydrazine addition salt stabilizer.

The hydrazine addition salt-copper salt mixture in each case effected a pronounced increase in stability of the polyester resin composition compared with the stabilization obtained by the sole use of a copper salt.

*Example 29*

The procedure of Example 22 was repeated using different hydrazine addition salt-copper salt mixtures. The hydrazine addition salt was used in concentrations of 800 parts per million parts of polyester resin.

TABLE III

Comparative Effect of 800 p.p.m. of Hydrazonium Salts on Premature Gelation of a Polyester Resin]

| Salt | Gel Time | Copper (p.p.m) |
| --- | --- | --- |
| None | 19 min | 1 |
| N,N'-diamino-N,N'-dibenzyl piperazonium dichloride. | 72 hours | 1 |
| N,N'-diamino-N,N'-dibenzyl piperazonium diiodide. | 264+ hours | 1 |
| N,N'-diamino-N,N,N',N'-tetramethyl butene-2-diammonium-1,4-dichloride. | 2 hours | 1 |
| 1-benzyl-1,1-dimethyl hydrazonium chloride | 36 hours | 1 |
| 1-benzyl-1,1,2-trimethyl hydrazonium chloride. | 46 hours | 1 |
| 1-benzyl-1-methyl-1-phenyl hydrazonium chloride. | 31 hours | 1 |
| 1,1-dibenzyl-1-phenyl hydrazonium chloride | 54 hours | 1 |
| 1,1-dimethyl-1-phenyl hydrazonium chloride | 20 hours | 1 |
| 1,1-dimethyl-1-phenyl hydrazonium iodide | 264+ hours | 1 |
| 1-allyl-1,1-dimethyl hydrazonium chloride | 24 hours | 1 |

The hydrazine addition salt-copper salt mixture in each case increased the stability of the polyester resin composition compared with the stabilization obtained by the sole use of a copper salt.

*Example 30*

The process of Example 22 was repeated using various non-salt hydrazine compounds. The corresponding addition salts of the analogous hydrazine compound are shown for comparison. The results are summarized in Table IV.

TABLE IV

[Effect of Hydrazine and Derivatives on Gelation of Polyester Resins]

| Compound | Compound (p.p.m.) | Copper (p.p.m.) | Gel time at 70°C. |
| --- | --- | --- | --- |
| | | 1.0 | 19 minutes. |
| Hydrazine | 800 | 1.0 | 3 minutes. |
| 1,1-dimethyl hydrazine | 800 | 1.0 | 4 minutes. |
| 1,1-dimethyl hydrazine hydrochloride. | 800 | 1.0 | 264 hours. |
| 1,1,1-trimethyl hydrazonium iodide. | 800 | 1.0 | 101 hours. |
| N-amino piperidine | 800 | 1.0 | 2 minutes. |
| N-amino-N-benzyl piperidonium chloride. | 800 | 1.0 | 11 hours. |
| Phenyl hydrazine | 160 | 0.16 | 8 minutes. |
| Phenyl hydrazine hydrochloride. | 160 | 0.16 | 10 hours. |

The above results show that non-salt hydrazine compounds have no synergistic effect with copper in stabilizing mixtures of polyester resins. If, however, a salt is made of the hydrazine compound, the stability time is greatly increased. The base, 1,1-dimethyl hydrazine, gives a gel time of 4 minutes. The use of the hydrochloride increased gel time to 264 hours, an increase of 5000 fold over that of the non-salt; the methyl iodide salt increased gel time to 101 hours, an increase of 2000 fold over that of the non-salt. The base, N-amino piperidine, gives a gel time of only 2 minutes; the benzyl chloride salt increases gel time to 11 hours, an increase of more than 300 fold over that of the non-salt. Phenyl hydrazine gives a gel time of only 8 minutes; the hydrochloric acid salt increases the gel time to 10 hours, an increase of 70 fold over that of the non-salt. The great synergistic effect obtained with the hydrazine addition salt-copper salt mixtures is readily apparent. Moreover, it will be noted that the hydrazine-copper salt mixtures do not give as great a gel time as does the polyester resin composition stabilized only with copper.

*Example 31*

The process of Example 22 was repeated using varying quantities of dimethyl hydrazine hydrochloride with 0.16 part of copper salt per million parts of polyester resin. The results are summarized in Table V.

TABLE V

| Inhibitor salt | Salt (p.p.m.) | Copper (p.p.m.) | Gel time at 70° C., hours |
| --- | --- | --- | --- |
| Dimethyl hydrazine hydrochloride | 160 | 0.16 | 31 |
| Do | 240 | 0.16 | 44 |
| Do | 320 | 0.16 | 25 |
| Do | 640 | 0.16 | 55 |

Stability of the polyester resin generally increased with increase in the amount of hydrazonium salt. The polyester resins remained substantially clear over the period of the test runs, but possessed a slight yellowish cast. The stabilized resin at 640 parts of hydrazonium salt per million parts of polyester resin represents a resin composition of good commercial value.

*Example 32*

The process of Example 22 was repeated using varying quantities of dimethyl hydrazine hydrochloride and one part of copper salt per million parts of polyester resin. The results are summarized in Table VI.

TABLE V

| Inhibitor salt | Salt (p.p.m.) | Copper (p.p.m.) | Gel time at 70° C., hours |
| --- | --- | --- | --- |
| Dimethyl hydrazine hydrochloride | 400 | 1.0 | 141 |
| Do | 400 | 1.0 | 165 |
| Do | 800 | 1.0 | 192 |
| Do | 800 | 1.0 | 264 |

The results varied somewhat in this example due to the use of different preparations of the polyester resinous composition. The orders of magnitude however, are indicative of the enhanced storage life obtained when the concentration of copper salt is increased. In comparing the results of Example 31 with those of this example, there is more than a 100 hour increase in gel time when the copper concentration is increased from 0.16 part to 1.0 part per million parts of polyester resin.

*Example 33*

The process of Example 22 was repeated using phenyl hydrazine hydrochloride with one part of copper salt per million parts of polyester resin. The results are summarized in Table VII.

TABLE VII

| Inhibitor salt | Salt (p.p.m.) | Copper (p.p.m.) | Gel time at 70° C., hours |
|---|---|---|---|
| Phenyl hydrazine hydrochloride | 400 | 1.0 | 30 |
| Do | 800 | 1.0 | 104 |

An increase in gel time of the polyester resin composition is obtained with greater quantities of the hydrazonium salt. The polyester resin composition has a faint orange cast due to slight decomposition of the phenyl hydrazine hydrochloride.

*Example 34*

The process of Example 22 was repeated using different hydrazine salts at varying concentrations. The copper salt was used in such amounts as to give one part of dissolved copper per million parts of polyester resin. The results are summarized in Table VIII.

TABLE VIII

| Inhibitor salt | Salt (p.p.m.) | Copper (p.p.m.) | Gel time at 70° C., hours |
|---|---|---|---|
| Dimethyl hydrazine hydrochloride | 400 | 1.0 | 141 |
| Dibutyl hydrazine hydrochloride | 400 | 1.0 | 57 |
| Dimethyl hydrazine dichloroacetate | 400 | 1.0 | 4½ |
| Dimethyl hydrazine oxalate | 400 | 1.0 | 2 |
| Dimethyl hydrazine benzene phosphonate | 400 | 1.0 | 25 |
| Dimethyl hydrazine p-toluene sulfonate | 400 | 1.0 | 4 |
| Phenyl hydrazine hydrochloride | 400 | 1.0 | 30 |
| Dimethyl hydrazine hydrochloride | 800 | 1.0 | 192 |
| Dibutyl hydrazine hydrochloride | 800 | 1.0 | 57 |
| Dimethyl hydrazine dichloroacetate | 800 | 1.0 | 4½ |
| Dimethyl hydrazine oxalate | 800 | 1.0 | 3 |
| Dimethyl hydrazine benzene phosphonate | 800 | 1.0 | 49 |
| Dimethyl hydrazine p-toluene sulfonate | 800 | 1.0 | 9 |
| Phenyl hydrazine hydrochloride | 800 | 1.0 | 104 |

The results above are indicative of the enhanced gel life obtained when the salts of strong acids are used. Longer gel times are obtained when the anion of a strong mineral acid such as chloride is used. Weaker organic acids having less strong negative charges on the other hand, do not give as good results. Gel times as shown in Table VIII generally increased with increase in hydrazonium salt concentration.

*Example 35*

One hundred parts of the polyester resin prepared in Example 2 were mixed with 50 parts of a styrene monomer. Benzyl dimethyl hydrazonium chloride was added to this mixture in the presence of dissolved copper and in the absence of dissolved copper. The results are summarized in Table IX.

TABLE IX

| Benzyl dimethyl hydrazonium chloride inhibitor (p.p.m.) | Copper (p.p.m.) | Gel time at 70° C., hours |
|---|---|---|
| 100 | 0 | 1 |
| 265 | 0 | 1 |
| 173 | 2 | 126 |

The above table shows that the use of benzyl dimethyl hydrazonium chloride in varying proportions has little effect in stabilizing the ployester resin-styrene monomer mixture against premature gelation in the absence of added copper. When two parts of dissolved copper per million parts of polyester resin are added to the mixture, stability is increased 126 times that observed when the mixture contains no dissolved copper.

*Example 36*

A portion of the polyester prepared according to Example 1 was diluted with one half of its weight of styrene and copper naphthenate was added to bring the concentration of copper ion to one part per million of the resin. Hydroquinone was added to give a concentration of 125 parts of hydroquinone per million of the resin. One hundred parts of a talc filler, as well as auxiliary curing aids, diethyl aniline and cobalt naphthenate were added to an equal weight of resin. The composition of this example was evaluated with 1-benzyl-1,1-dimethyl hydrazonium chloride. Inhibiting effect is summarized in Table X.

TABLE X

| Inhibitor salt | Salt (p.p.m.) | Copper (p.p.m.) | Cobalt (p.p.h.) | Talc (parts) | Diethyl aniline (p.p.h.) | Gel time at 70° C., hrs. |
|---|---|---|---|---|---|---|
| 1-benzyl-1,1-dimethyl hydrazonium chloride | 0 | 1.0 | .048 | 100 | .4 | 29 |
| Do | 500 | 1.0 | .048 | 100 | .4 | 68 |
| Do | 1,000 | 1.0 | .048 | 100 | .4 | 80 |
| Do | 2,000 | 1.0 | .048 | 100 | .4 | 300 |

The above results show the effect of copper salts and hydrazonium salts on the gelation time in the presence of the auxiliary promoters, diethyl aniline and cobalt naphthenate. The gelation time increases with the increase in hydrazonium salt concentration. At lower concentrations of hydrazonium salt the period of stability is more than twice that obtained without the addition of hydrazonium salt, whereas at higher concentrations the period of stability is increased more than ten fold. The gelation rate of the above mixtures in the presence of a polymerization initiator is shown in Example 43.

*Example 37*

The polyester resin prepared in Example 3 was mixed with 9.5 parts of styrene monomer containing copper naphthenate in such quantity as to yield one part of copper per million parts of the resin. Benzyl dimethyl hydrazonium chloride, cobalt naphthenate, and 110 parts of hydroquinone per million parts of polyester resin were added to this resin with the results shown in Table XI.

TABLE XI

| Benzyl dimethyl hydrazonium chloride (p.p.m.) | Hydroquinone (p.p.m.) | Copper (p.p.m.) | Cobalt (p.p.h.) | Gel time at 70° C., days |
|---|---|---|---|---|
|  | 110 | 1 |  | 15 |
|  | 110 | 1 | .00288 | 8 |
| 35 | 110 | 1 | .00288 | 29 |
| 106 | 110 | 1 | .00288 | 37 |
| 317 | 110 | 1 | .00288 | 40 |

It will be noted from the above Table that a polyester resin composition stabilized with a hydroquinone inhibitor has an increased gel life when small quantities of hydrazonium salt are added to the system. The gel life is more than doubled and almost tripled, depending on the concentration of hydrazonium salt which is employed. Cobalt effects a decrease in gel time when used with hydroquinone without the hydrazonium salt; however, it is effective in promoting the cure of the resin as shown in Example 42. Addition of hydrazonium salt results in a longer gel time, while increasing the concentration of hydrazonium salt is effective in giving still more prolonged gel times.

*Example 38*

Seventy parts of a polyester prepared according to the procedure described in Example 1 were diluted with 30 parts of styrene containing sufficient hydroquinone to give 125 parts per million parts of the resin and copper naphthenate sufficient to yield 1 part of copper per million parts of the resin. A mixture of 0.6 part of diethyl aniline and 0.135 part of cobalt naphthenate containing 6% cobalt was then added to the polyester resin composition. This composition was treated respectively with 1-benzyl-1,1-dimethyl hydrazonium chloride, 1-benzyl-1,1-dibutyl hydrazonium chloride and 1,1-dimethyl hydrazine hydrochloride with the results shown below in Table XII.

TABLE XII

| Inhibitor salt | Salt concentration (p.p.m.) | Copper (p.p.m.) | Hydroquinone (p.p.m.) | Cobalt (p.p.h.) | Gel time at 70° C., hrs. |
|---|---|---|---|---|---|
| 1-benzyl-1,1-dimethyl hydrazonium chloride | 466 | 1 | 125 | .135 | 175 |
| 1-benzyl-1,1-dibutyl hydrazonium chloride | 631 | 1 | 125 | .135 | 98 |
| 1-1dimethyl hydrazine hydrochloride | 311 | 1 | 125 | .135 | 52 |

PROMOTION EFFECTS OF HYDRAZINE ADDITION SALT—COPPER SALT MIXTURES ON POLYESTER RESIN COMPOSITIONS

The advantage of promoting the homolytic cleavage of peroxide materials to yield free radicals at ambient temperatures has been described. This effect is usually attained by mixing promoters or promoting combinations in the polyester resin composition. Other materials, such as fillers, flame retardants, ultra violet absorbers required to yield a desirable and usable product, may also be present along with the promoter when the composition is polymerized. Combinations of hydrazonium salts with traces of copper ion may be used as promoters with very beneficial results. These promoters may either be used alone or in combination with other promoters, such as cobalt and manganese salts, aryl amines, arylamine salts, quaternary ammonium salts or other promoters known to the art. In the following examples, the polyester resin mixtures are treated with a free radical source to effect gelation of the polymerizable mixture. Gelation time is measured as the time elapsing from the addition of the polymerization initiator until the first manifestation of crosslinking to a stringy or gelatinous mass.

*Example 39*

The resins described in Example 38 were polymerized with one part of a 60% solution of methyl ethyl ketone peroxide in dimethyl phthalate (Lupersol DDM) per hundred parts of resin with the results shown in Table XIII.

TABLE XIII

| Salt | Salt concentration, (p.p.m.) | Copper (p.p.m.) | DDM (p.p.h.) | 85° F. gel time, mins. |
|---|---|---|---|---|
| 1-benzyl-1,1-dimethyl hydrazonium chloride | 466 | 1 | 1 | 9 |
| 1-benzyl-1,1-dibutyl hydrazonium chloride | 631 | 1 | 1 | 9.5 |
| 1,1-dimethyl hydrazine hydrochloride | 311 | 1 | 1 | 0.5 |
|  |  | 1 | 1 | 13 |

The above results show the beneficial properties of hydrazonium salts on the promotion of gelation of polyester resin compositions in the presence of a free radical polymerization initiating agent. A decrease in gel time of at least 30% below that when hydroquinone is used alone is obtained demonstrating the effectiveness of the hydrazonium salt-copper salt mixture as promoters. Moreover, this is further manifested in the higher peak exotherm values shown above when hydrazonium salt mixtures are used as promoters.

*Example 40*

A blend of a resin which contained 70% of the material described in Example 4, 20% of the resin described in Example 1 and 10% of styrene was compounded with .2% of 1-benzyl-1,1-dimethyl hydrazonium chloride, and 0.5 p.p.m. of copper as copper naphthenate. To this mixture was added a small quantity of a dialkyl aryl amine and cobalt naphthenate. The resin was stable to gelation for 170 hours at 70° C.; however, when mixed with 0.5% of Lupersol DDM, it gelled in 5.2 minutes at 85° F.

*Example 41*

The polyester resin obtained in Example 5 was diluted with a sufficient quantity of styrene monomer to yield a resin which contained 40% of the monomer. Copper naphthenate was added in such quantity that the concentration of copper in the resin was 1.6 parts per million. When this resin was treated with tertiary butyl perbenzoate at 0.33 part per hundred parts of resin and heated at 125° F., more than ten hours were required to yield gelation.

The addition of 1-benzyl-1,1-dimethyl hydrazonium chloride at 1000 parts per million parts of the resin lowered the gelation time to 11.67 minutes. Similar results were obtained with other peroxidic materials such as lauroyl peroxide, benzoyl peroxide, methyl ethyl ketone peroxide and a mixture of lauroyl peroxide with cumene hydroperoxide.

Example 42

The polyester resin-styrene monomer composition of Example 4 was subjected to polymerization with one part of Lupersol DDM per hundred parts of resin with the results shown in Table XIV.

TABLE XIV

| Benzyl-1,1-dimethyl hydrazonium chloride (p.p.m.) | Hydroquinone (p.p.m.) | Copper (p.p.m.) | Cobalt (p.p.h.) | DDM (p.p.h.) | Gel time at 85°C. |
|---|---|---|---|---|---|
|  | 110 | 1.0 |  | 1.0 | 2 plus days. |
|  | 110 | 1.0 | .00288 | 1.0 | 41 min. |
| 35 | 110 | 1.0 | .00288 | 1.0 | 24 min. |
| 106 | 110 | 1.0 | .00288 | 1.0 | 22¼ min. |
| 317 | 110 | 1.0 | .00288 | 1.0 | 22 min. |

When copper is added to a hydroquinone stabilized system without the hydrazonium salt, the gelation time of the polyester resin is prohibitively long. The use of cobalt in conjunction with copper has a marked beneficial effect but the resulting composition still possesses an inferior gel time compared to the composition containing benzyl dimethyl hydrazonium chloride. When the hydrazonium salt is added to the mixture, the gel time is reduced to one-half the value obtained without the hydrazine addition salt.

Example 43

The polyester resin-styrene monomer composition of Example 4 was polymerized with two parts of Lupersol DDM per hundred parts of resin with the results shown in Table XV.

TABLE XV

| 1-benzyl-1,1-dimethyl hydrazonium chloride (p.p.m.) | Copper (p.p.m.) | Cobalt (p.p.h.) | DDM (p.p.h.) | Talc (parts) | Diethyl aniline (p.p.h.) | Gel time at 76° C., min. |
|---|---|---|---|---|---|---|
|  | 1.0 | .8 | 2 | 100 | .4 | 3 |
| 500 | 1.0 | .8 | 2 | 100 | .4 | 3 |
| 1,000 | 1.0 | .8 | 2 | 100 | .4 | 3 |
| 2,000 | 1.0 | .8 | 2 | 100 | .4 | 3 |

The hydrazonium salts above gave very effective results as an auxiliary promoting agent in gelling the polyester resin compositions of this example when a peroxidic free radical initiating agent was added to the mixture. Increase in concentration of the hydrazine addition salt does not enhance the promotion time for this resin composition. The promotion time obtained without the hydrazine addition salt gives similar results to those obtained with the hydrazine addition salt when diethyl aniline is used in the promoter system. The results of Example 36, however, show that the mixture without the hydrazine addition salt has shorter gel life when used as a stabilizer than does the mixture containing the hydrazine addition salt. This demonstrates the combination of enhanced stabilization and promotion effects which are obtained with the hydrazine addition salt-copper salt mixtures of this invention.

Example 44

This example illustrates the use of hydrazine addition salts of relatively high molecular weight. The hydrazine addition salts were prepared from the appropriate alkyl halide and 1,1-dimethyl hydrazine. Most of the alkyl chlorides were not commercially available, an exception being n-dodecyl chloride. The bromides were prepared by allowing the normal alkyl bromide to stand in the presence of 1,1-dimethyl hydrazine and warming gently to hasten the reaction. The chlorides, other than n-dodecyl chloride, were prepared by heating a water solution of the bromide in the presence of an excess of silver chloride. The silver bromide which formed was removed by filtration and the aqueous chloride solution evaporated to dryness. All salts prepared were recrystallized from appropriate solvents.

A polyester was prepared by esterifying 1.98 moles of diethylene glycol, 0.64 mole of ethylene glycol, 1.00 mole of phthalic anhydride and 1.5 moles of maleic anhydride at 200° C. under a blanket of carbon dioxide until an acid number of 45 was attained. The polyester was then cooled to 100° C. and removed to storage vessels.

A xylene solution of copper naphthenate was added to 35 grams of the above melted polyester in a 4 ounce container at 100° C. in such quantity that the final resin contained 1 part copper per million parts resin. This resin was then thoroughly mixed and allowed to cool to 105° C., at which point the appropriate quantity of hydrazine addition salt solution was added to give 800 parts of the salt per million parts of the resin. When the resin had cooled to 100° C., 15 grams of styrene was added and thoroughly mixed into the resin. All of the foregoing additions and mixing were performed under a blanket of carbon dioxide. The container was then capped and placed in an oven held at 70° C. All of the salts were added as methanol solutions. The salts were added in 20% solutions, except for the octadecyl and docosyl salts which were added in 10% solutions. The docosyl salt solution required mild warming to complete solution before addition.

Where a single component was added to the resin or incomplete combination of components were added as set forth in Table XVI, the polyester and resin were carried through the identical temperature and mixing cycles. The results of the inhibition tests are shown in Table XVI, with the gelation time being recorded as the time elapsed from the addition of the styrene.

TABLE XVI

Comparative Effect of 800 PPM of Salts on Premature Gelation of a Polyester Resin

|  | Copper conc. (p.p.m.) | Gel time, hrs. |
|---|---|---|
| None | 0 | .2 |
| Do | 1 | 4.2 |
| 1,1-dimethyl-1-benzyl hydrazonium chloride | 1 | 168 |
| 1,1-dimethyl-1-undecyl hydrazonium bromide | 1 | 13.8 |
| 1,1-dimethyl-1-undecyl hydrazonium chloride | 1 | 97 |
| 1,1-dimethyl-1-dodecyl hydrazonium bromide | 1 | 7.4 |
| 1,1-dimethyl-1-dodecyl hydrazonium chloride | 1 | 78 |
| 1,1-dimethyl-2-dodecyl hydrazonium chloride | 0 | 7.1 |
| 1,1-dimethyl-1-hexadecyl hydrazonium bromide | 1 | 6.6 |
| 1,1-dimethyl-1-hexadecyl hydrazonium chloride | 1 | 78 |
| 81,1-dimethyl-1-octadecyl hydrazonium chloride | 1 | 74.5 |
| 1,1-dimethyl-1-docosyl hydrazonium chloride | 1 | 77 |

Although the higher molecular weight hydrazine addition salts with copper effect synergistic inhibition of polyester resins, it will be observed that such salts have less inhibition effect than hydrazine addition salts of lower molecular weights with copper. It is speculated that this is solely a diluting effect of the essential nitrogen and anion portion of the molecule. Again, the results shown in Table XVI show that the chloride salts are more effective as inhibitors than the bromides.

*Example 45*

The procedure of Example 44 was repeated except that unsubstituted hydrazine addition salts were employed. Hydrazine hydrochloride and hydrazine dihydrochloride were prepared by the addition of the stoichiometric quantities of concentrated hydrochloric acid to an ethanol solution of anhydrous hydrazine. The salts formed were removed by filtration and unreacted materials removed from the solid under vacuum at room temperature. Aqueous 20% solutions of the salts were used in the additions. The results of the inhibition tests are shown in Table XVII.

TABLE XVII

| Inhibitor salt | salt (p.p.m.) | Copper (p.p.m.) | Gelation time at 70° C. |
|---|---|---|---|
| Hydrazine hydrochloride | 800 | 1 | 66 hrs. |
| Do | 800 | 0 | 4 hrs. |
| Hydrazine dihydrochloride | 800 | 1 | 92 hrs. |
| Do | 800 | 0 | 1 hr., 42 min. |

The above results show unsubstituted hydrazine addition salts to be effective synergistic inhibitors with copper.

*Example 46*

This example illustrates the polyester promotion effect of the higher molecular weight hydrazine addition salts of Example 44 and of the unsubstituted hydrazine addition salts of Example 45 when used in conjunction with copper.

A plant prepared sample of a general purpose polyester resin was employed in this example. The base polyester was prepared by esterifying 1.0 mole of phthalic anhydride, 1.0 mole of maleic anhydride, and 2.0 moles of 1,2-propylene glycol at 200° C. under a blanket of carbon dioxide to an acid number of 45. Styrene and copper naphthenate was added to the polyester resin in such quantities as to result in a final resin containing 33% styrene and 1 part copper per million parts of final resin.

An appropriate quantity of hydrazine addition salt was added to 50 grams of the above resin to yield 800 parts of the salt per million parts of resin. The salts dissolved in the resin and mixing was continued for 60 seconds. Thereafter, 0.6 gram of Lupersol DDM (60% solution of methyl ethyl ketone peroxide in dimethyl phthalate) was added and stirred into the resin for 30 seconds. The gelation time of the promoted and catalyzed resins was measured by the time elapsed from the addition of Lupersol DDM to the time at which the resin, at ambient temperature, gelled or became of jelly-like, non-flowing consistency. In all other respects, the procedure of Example 44 was followed. The results of the promotion tests are shown in Table XVIII.

TABLE XVIII

| Salt | Gel time |
|---|---|
| 1,1-dimethyl-1-benzyl hydrazonium chloride | 1 hour, 22 minutes. |
| 1,1-dimethyl-1-dodecyl hydrazonium chloride | 1 hour, 6 minutes. |
| 1,1-dimethyl-1-dodecyl hydrazonium bromide | 47 minutes. |
| 1,1-dimethyl-1-hexadecyl hydrazonium chloride | 1 hour, 12 minutes. |
| 1,1-dimethyl-1-octadecyl hydrazonium chloride | 1 hour, 18 minutes. |
| 1,1-dimethyl-1-docecyl hydrazonium chloride | 1 hour, 29 minutes. |
| Hydrazine hydrochloride | 39 minutes. |
| Hydrazine dihydrochloride | 50 minutes. |
| Blank | 77 hours, 46 minutes. |

*Example 47*

This example illustrates the use of various copper compounds with hydrazine addition salts as both synergistic inhibitors and synergistic promoters of polyester resins.

The solutions of copper nitrate trihydrate, copper sulfate pentahydrate, and copper bromide were prepared in dilute solutions without further treatment. Dilute copper acetate monohydrate required a few drops of acetic acid to effect complete solution. The basic copper carbonate and the cuprous chloride were not completely soluble in water even at very low concentrations. Sufficient ammonium hydroxide was added to the same which yielded homogeneous solutions.

An unsaturated polyester was prepared from 147 parts of maleic anhydride, 148 parts of phthalic anhydride, 40 parts of ethylene glycol, and 210 parts of diethylene glycol. The glycols and anhydrides were heated to 210° C. under a blanket of carbon dioxide with stirring until the acid number had dropped to 44. The aqueous distillate was recovered in a Dean-Stark water trap. The polyester was then cooled to 110° C. and poured into individual glass containers for blending with copper solutions, 1-benzyl-1,1-dimethyl hydrazonium chloride and styrene.

To 70 parts of the polyester at 110° C. was added sufficient aqueous copper solution such that the final resin contained one part per million of copper. At a resin temperature of 105° C., a 20% solution of 1-benzyl-1,1-dimethyl hydrazonium chloride was added in such quantity that final concentration of the salt was 500 parts per million parts of the final resin. At 100° C. resin temperature, 30 parts of styrene was added and the blend stirred to complete solution. All blending was carried out under a blanket of carbon dioxide to avoid oxidative effects.

A portion of the warm resin was immediately sealed from air and placed in an oven maintained at 70° C. Uncatalyzed stability was taken at the time the resin gelled. A second portion of the blended resin was cooled immediately to 80° F. to which was added 0.5 part (per hundred parts resin) of t-butyl hydroperoxide. The gelation time was taken when the resin congealed.

The results of the above two sets of tests are shown in Table XIX.

TABLE XIX

| Copper salt | Copper (p.p.m.) | 1-benzyl-1,1-dimethyl hydrazonium chloride (p.p.m.) | 70° C. uncatalyzed stability | 80° F. catalyzed gel time |
|---|---|---|---|---|
| None | 0 | 0 | 40 min | 9 hrs., 30 min. |
| Do | 0 | 500 | 7 hrs., 30 min | 1 hr., 30 min. |
| Cupric acetate | 1 | 0 | 2 hrs | 7 hrs. |
| Do | 1 | 500 | Over 48 hrs | 1 hr., 7 min. |
| Cupric nitrate | 1 | 0 | 1 hr., 42 min | 11 hr., 15 min. |
| Do | 1 | 500 | Over 45 hrs | 1 hr., 20 min. |
| Cupric sulfate | 1 | 0 | 40 min | 9 hrs., 10 min. |
| Do | 1 | 500 | 39 hrs | 1 hr., 20 min. |
| Cupric carbonate (NH₄OH) | 1 | 0 | 2 hrs., 20 min | 7 hrs., 12 min. |
| Do | 1 | 500 | 47 hrs | 54 min. |
| Cupric bromide | 1 | 0 | 6 hrs., 30 min | 2 hrs. |
| Do | 1 | 500 | 43 hrs | 1 hr., 24 min. |
| Cuprous chloride (NH₄OH) | 1 | 0 | 3 hrs., 45 min | 2 hrs., 50 min. |
| Do | 1 | 500 | Over 44 hrs | 1 hr., 2 min. |

Only the samples containing both copper and hydrazine addition salt became essentially completely cured. This was manifested by the high heat of reaction, i.e., by the fact that such samples reached temperatures of over 200° F. The cured cold resins were hard and as such would be useful in commercial applications.

On the other hand, all other samples which were hydroperoxide catalyzed but did not contain both copper and hydrazine addition salt yielded materials which ranged from soft jelly-like consistency to soft solids and did not manifest any appreciable exothermic reaction.

The results shown in Table XIX bear out the fact that it is the copper ion rather than the particular copper compound, which is critical in the present invention to give synergistic inhibiting and promoting effects wth hydrazine addition compounds.

From the foregoing examples, it is apparent that the use of hydrazine addition salts with traces of copper markedly improves the uncatalyzed stability of polyester resins which consist essentially of an alpha, beta ethylenically unsaturated polyester and an ethylenically unsaturated monomer. It is noteworthy that, whereas long storage life is obtained by the use of this combination of salts, controlled polymerization is not affected adversely; in fact, reaction to produce a gelled resin is faster than when no hydrazine addition salt-copper combination is used.

This enables the resin manufacturer to adequately inhibit premature gelation and the fabricator to obtain a fast gel time which is not possible when quinone or phenolic type inhibitors are used.

The resin mixtures of this invention may be used for many applications, such as in matched die molding, hand lay up systems, patching putty, potting, casting of electrical and mechanical parts and the like. These resins may be reinforced or filled with glass fibers, asbestos, talc, wood flour and organic fibers, such as the polyamide nylon. Mixtures of the resins can be applied to wood, metal, paper, metals or cloth as protective coatings.

The examples given herein are to be regarded merely as illustrating the principles of the invention. It will be apparent to those skilled in the art that numerous modifications may be made therein without departing from the spirit of the invention or the scope of the appended claims.

Having thus described our invention, what we claim and desire to protect by Letters Patent is:

1. A method for inhibiting the polymerization of a polymerizable composition containing a polyester obtained by reacting an alcohol having at least two hydroxyl groups capable of ester formation with a compound selected from the group consisting of alpha-beta ethylenically unsaturated dicarboxylic acids and the anhydrides thereof and an ethylenically unsaturated monomeric compound containing the $>C=CH_2$ group which comprises adding inhibiting amounts of a hydrazine addition salt-organic copper salt mixture, wherein said hydrazine addition salt is selected from the group consisting of salts having the formulae:

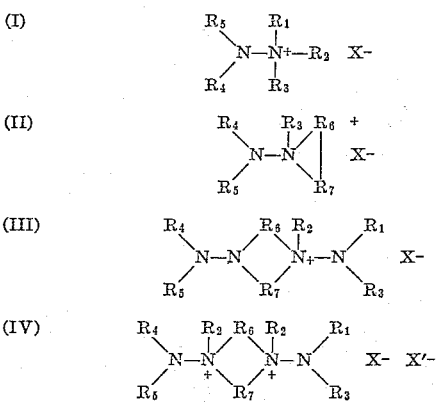

wherein $R_1$ is an organic radical with up to 7 carbon atoms in said radical, and $R_2$, $R_3$, $R_4$ and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X' are anionic radicals selected from the group consisting of organic and inorganic acids having a dissociation constant of at least $1 \times 10^{-5}$, to said polymerizable composition to give a polymerizable composition having enhanced storage life with freedom from premature gelation.

2. The method of claim 1 wherein said polyester contains at least one recurring esterified acid radical selected from the group consisting of maleic acid, fumaric acid, glutaconic acid, aconitic acid, itaconic acid, and citraconic acid radicals.

3. The method of claim 1 wherein said monomeric compound is selected from the group consisting of styrene, vinyl chloride, vinyl acetate, methyl methacrylate, methyl acrylate, methacrylic acid and vinyl pyridine.

4. A method of controlling the polymerization of polymerizable compositions containing an ethylenically unsaturated monomer containing the $>C=CH_2$ group and a polyester obtained by reacting an alcohol containing at least two hydroxyl groups capable of ester formation with a compound selected from the group consisting of alpha-beta ethylenically unsaturated dicarboxylic acids and the anhydrides thereof which comprises adding a stabilizing amount of a hydrazine addition salt-organic copper salt mixture, wherein said hydrazine addition salt is selected from the group consisting of salts having the formulae:

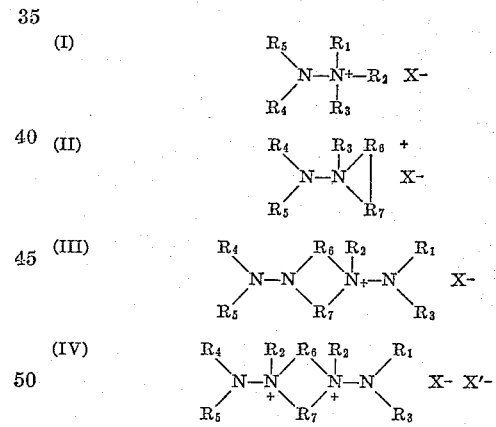

wherein $R_1$ is an organic radical with up to 7 carbon atoms in said radical, and $R_2$, $R_3$, $R_4$, and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X' are anionic radicals selected from the group consisting of organic and inorganic acids having a dissociation constant of at least $1 \times 10^{-5}$, to effect inhibition of polymerization and give a stabilized polymerizable composition, said stabilized polymerizable composition being readily polymerizable upon the addition of free radical polymerization initiating compounds.

5. A method of controlling the polymerization of a polymerizable composition containing (1) the polyester formed by the esterification of at least one alcohol selected from the group consisting of diethylene glycol and ethylene glycol with phthalic anhydride and maleic anhydride and (2) an aralkene containing a $>C=CH_2$ group which comprises adding a stabilizing amount of a hydrazine addition salt-organic copper salt mixture, wherein said hydrazine addition salt is selected from the group consisting of salts having the formulae:

(I) 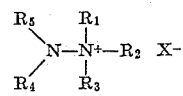

(II) 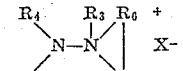

(III) 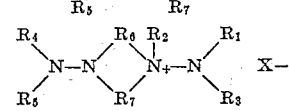

(IV) 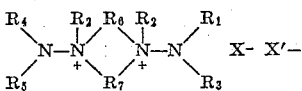

wherein $R_1$ is an organic radical with up to 7 carbon atoms in said radical, and $R_2$, $R_3$, $R_4$ and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X′ are anionic radicals selected from the group consisting of organic and inorganic acids having a dissociation constant of at least $1 \times 10^{-5}$, to the polymerizable composition.

6. The method of claim 5 wherein said aralkene is styrene.

7. The method of claim 5 wherein the hydrazine addition salt is selected from the group consisting of 1-benzyl-1,1-dimethyl hydrazonium chloride and 1-allyl-1,1-dimethyl hydrazonium chloride.

8. A composition of matter which comprises an aralkene containing a >C=CH₂ group, the polyester formed by the esterification of at least one alcohol selected from the group consisting of diethylene glycol and ethylene glycol, at least one aromatic acid selected from the group consisting of phthalic acid and phthalic anhydride, and at least one aliphatic acid selected from the group consisting of maleic acid, maleic anhydride and fumaric acid and a hydrazine addition salt-organic copper salt mixture, wherein said hydrazine addition salt is selected from the group consisting of salts having the formulae:

(I) 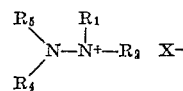

(II) 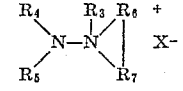

(III) 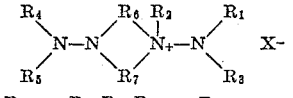

(IV) 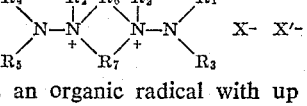

wherein $R_1$ is an organic radical with up to 7 carbon atoms in said radical, and $R_2$, $R_3$, $R_4$ and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X′ are anionic radicals selected from the group consisting of organic and inorganic acids having a dissociation constant of at least $1 \times 10^{-5}$.

9. The composition of matter of claim 8 wherein the hydrazine addition salt is N,N′-diamino-N,N,N′,N′-tetra methyl butene-2-diammonium dichloride.

10. The composition of matter of claim 8 wherein the hydrazine addition salt is 1,1-dimethyl-1-phenyl hydrazonium iodide.

11. In a method of preventing premature gelation of a copolymerizable mixture of a polyester obtained by reacting an alcohol having at least two hydroxyl groups capable of ester formation with a compound selected from the group consisting of alpha-beta ethylenically unsaturated dicarboxylic acids and the anhydrides thereof and an aralkene compound mutually soluble with and copolymerizable with said polyester, the step comprising dissolving therein a small gelation inhibiting amount of a hydrazine addition salt, wherein said hydrazine addition salt is selected from the group consisting of salts having the formulae:

(I) 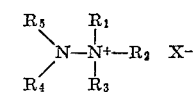

(II) 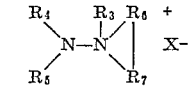

(III) 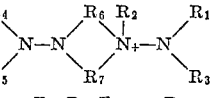

(IV) 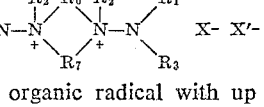

wherein $R_1$ is an organic radical with up to 7 carbon atoms in said radical, and $R_2$, $R_3$, $R_4$ and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X′ are anionic radicals selected from the group consisting of organic and inorganic acids having a dissociation constant of at least $1 \times 10^{-5}$, and a catalytic amount of an organic copper salt to give copolymerizable mixtures characterized by enhanced stability, storage life, and remaining in substantially an ungelled physical state.

12. The method of claim 11 wherein said aralkene compound contains a >C=CH₂ group.

13. The method of claim 12 wherein said aralkene compound is styrene.

14. The method of claim 11 wherein the hydrazine addition salt contains a non-oxidizing anion.

15. A method of controlling the polymerization of polymerizable compositions of a polyester obtained by reacting an alcohol having at least two hydroxyl groups capable of ester formation with a compound selected from the group consisting of alpha-beta ethylenically unsaturated dicarboxylic acids and the anhydrides thereof which comprises adding a stabilizing amount of hydrazine addition salt, wherein said hydrazine addition salt is selected from the group consisting of salts having the formulae:

(I) 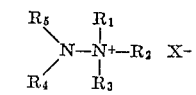

(II) 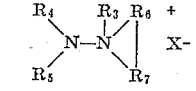

(III) 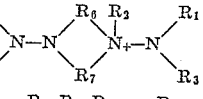

(IV) 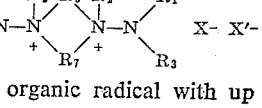

wherein $R_1$ is an organic radical with up to 7 carbon atoms in said radical, and $R_2$, $R_3$, $R_4$ and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X' are anionic radicals selected from the group consisting of organic and inorganic acids having a dissociation constant of at least $1 \times 10^{-5}$, and an organic copper salt.

16. A stabilized composition of matter comprising a polyester obtained by reacting an alcohol having at least two hydroxyl groups capable of ester formation with a compound selected from the group consisting of alpha-beta ethylenically unsaturated dicarboxylic acids and the anhydrides thereof and a stabilizing amount of a hydrazine addition salt, wherein said hydrazine addition salt is selected from the group consisting of salts having the formulae:

(I)

(II)

(III)

(IV)

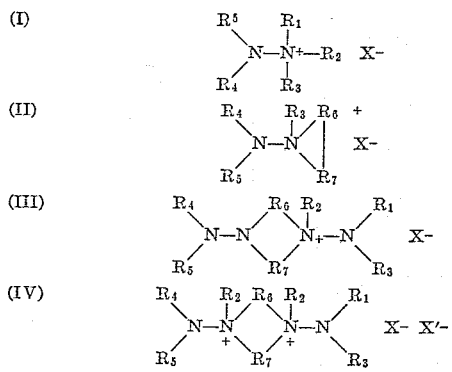

wherein $R_1$ is an organic radical with up to 7 carbon atoms in said radical, and $R_2$, $R_3$, $R_4$ and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X' are anionic radicals selected from the group consisting of organic and inorganic acids having a dissociation constant of at least $1 \times 10^{-5}$, and an organic copper salt.

17. A stabilized composition of matter comprising a mixture of an alpha,beta-ethylenically unsaturated polyester obtained by reacting an alcohol containing at least two alcoholic groups capable of ester formation and a compound selected from the group consisting of alpha,beta-ethylenically unsaturated carboxylic acids containing at least two acid groups and the anhydrides thereof containing at least one anhydride group and a stabilizing amount of a hydrazine addition salt, wherein said hydrazine addition salt is selected from the group consisting of salts having the formulae:

(I)

(II)

(III)

(IV)

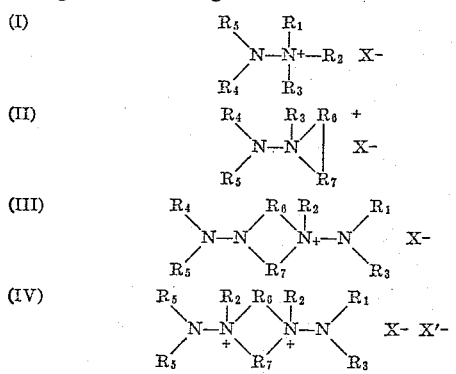

wherein $R_1$ is an organic radical with up to 7 carbon atoms in said radical, and $R_2$, $R_3$, $R_4$ and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X' are anionic radicals selected from the group consisting of organic and inorganic acids having a dissociation constant of at least $1 \times 10^{-5}$, and an organic copper salt.

18. A composition of matter comprising a copolymerizable mixture of a liquid, ethylenically unsaturated monomeric compound, a polyester of a dihydric alcohol and an alpha, beta-ethylenically unsaturated dicarboxylic acid, and a small stabilizing amount of a hydrazine addition salt, wherein said hydrazine addition salt is selected from the group consisting of salts having the formulae:

(I)

(II)

(III)

(IV)

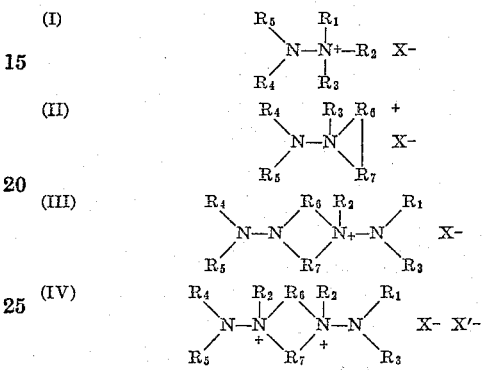

wherein $R_1$ is an organic radical with up to 7 carbon atoms in said radical, and $R_2$, $R_3$, $R_4$ and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X' are anionic radicals selected from the group consisting of organic and inorganic acids having a dissociation constant of at least $1 \times 10^{-5}$, and an organic copper compound.

19. A composition of matter comprising an ethylenically unsaturated monomer containing the $>C=CH_2$ group, a polyester obtained by reacting an alcohol having at least two hydroxyl groups capable of ester formation with a compound selected from the group consisting of alpha-beta ethylenically unsaturated dicarboxylic acids and the anhydrides thereof and a small stabilizing amount of a hydrazine addition salt, wherein said hydrazine addition salt is selected from the group consisting of salts having the formulae:

(I)

(II)

(III)

(IV)

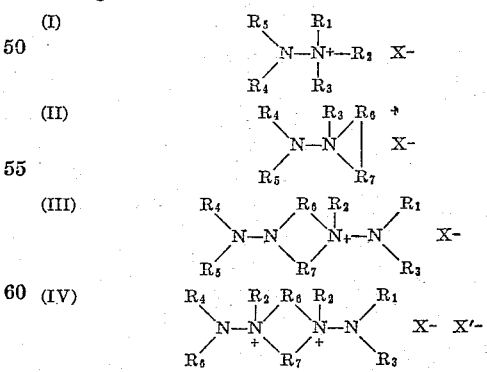

wherein $R_1$ is an organic radical with up to 7 carbon atoms in said radical, and $R_2$, $R_3$, $R_4$ and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X' are anionic radicals selected from the group consisting of organic and inorganic acids having a dissociation constant of at least $1 \times 10^{-5}$, and an organic copper salt, said composition being characterized by enhanced stability, storage life, and freedom from premature gelation.

20. A method of polymerization which comprises polymerizing a polyester obtained by reacting an alcohol having at least two hydroxyl groups capable of ester formation with a compound selected from the group consisting of alpha-beta ethylenically unsaturated dicarboxylic acids and the anhydrides thereof, with a free radical initiator in the presence of a hydrazine addition salt, wherein said hydrazine addition salt is selected from the group consisting of salts having the formulae:

(I)

(II)

(III)

(IV)

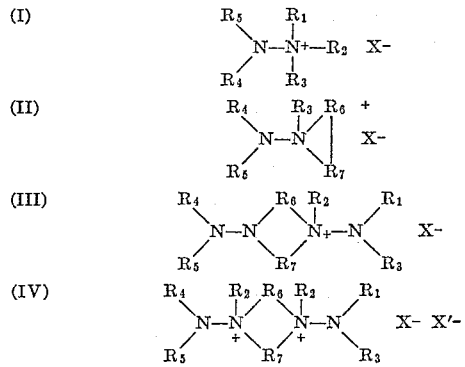

wherein $R_1$ is an organic radical with up to 7 carbon atoms in said radical, and $R_2$, $R_3$, $R_4$ and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X′ are anionic radicals selected from the group consisting of organic and inorganic acids having a dissociation constant of at least $1 \times 10^{-5}$, and an organic copper salt.

21. The method of claim 20 wherein the hydrazine addition salt is a mineral acid salt of hydrazine.

22. A method of polymerization which comprises polymerizing a polyester obtained by reacting an alcohol having at least two hydroxyl groups capable of ester formation with a compound selected from the group consisting of alpha-beta ethylenically unsaturated dicarboxylic acids and the anhydrides thereof and an ethylenically unsaturated monomer containing the $>C=CH_2$ group with a free radical initiator in the presence of a hydrazine addition salt, wherein said hydrazine addition salt is selected from the group consisting of salts having the formulae:

(I)

(II)

(III)

(IV)

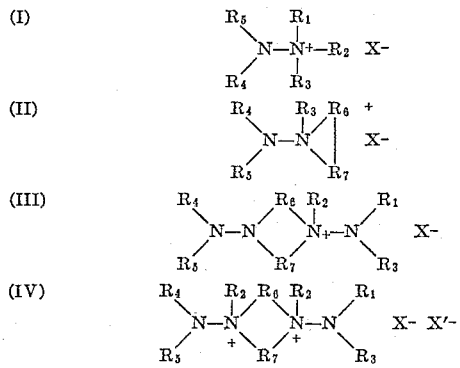

wherein $R_1$ is an organic radical with up to 7 carbon atoms in said radical, and $R_2$, $R_3$, $R_4$ and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X′ are anionic radicals selected from the group consisting of organic and inorganic acids having a dissociation constant of at least $1 \times 10^{-5}$, and an organic copper salt.

23. A method of polymerization which comprises polymerizing a polyester obtained by reacting an alcohol having at least two hydroxyl groups capable of ester formation with a compound selected from the group consisting of alpha-beta ethylenically unsaturated dicarboxylic acids and the anhydrides thereof with a free radical initiator in the presence of a hydrazine addition salt, wherein said hydrazine addition salt is selected from the group consisting of salts having the formulae:

(I)

(II)

(III)

(IV)

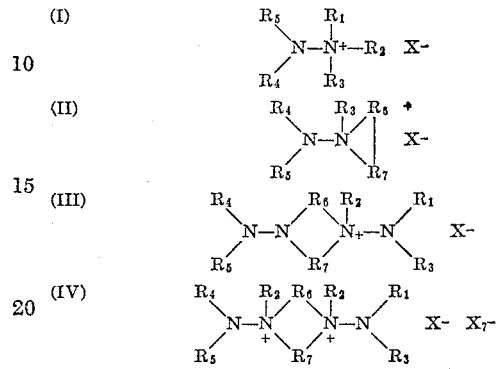

wherein $R_1$ is an organic radical with up to 7 carbon atoms in said radical, and $R_2$, $R_3$, $R_4$ and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X′ are anionic radicals selected from the group consisting of organic and inorganic acids having a dissociation constant of at least $1 \times 10^{-5}$, and an organic copper salt and at least one polymerization inhibitor selected from the group consisitng of quinones and dihydric phenols.

24. A method of polymerization which comprises polymerizing a polyester obtained by reacting an alcohol having at least two hydroxyl groups capable of ester formation with a compound selected from the group consisting of alpha-beta ethylenically unsaturated dicarboxylic acids and the anhydrides thereof and an ethylenically unsaturated monomer containing the $>C=CH_2$ group with a free radical initiator in the presence of a hydrazine addition salt, where said hydrazine addition salt is selected from the group consisting of salts having the formulae:

(I)

(II)

(III)

(IV)

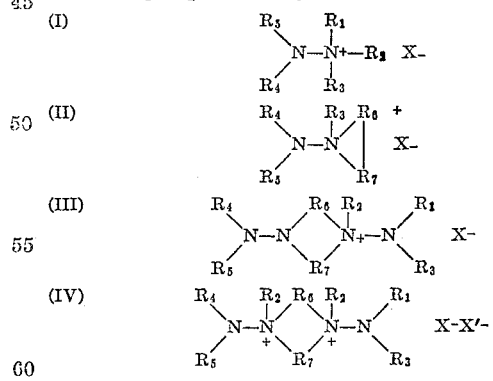

wherein $R_1$ is an organic radical with up to 7 carbon atoms in said radical, and $R_2$, $R_3$, $R_4$ and $R_5$ are selected from the group consisting of hydrogen, and organic radicals with up to 7 carbon atoms in said radical and $R_6$ and $R_7$ are selected from the group consisting of alkylene and substituted alkylene radicals with up to 3 carbon atoms, and X and X′ are anionic radicals selected from the group consisting of organic and inorganic acids having a dissociation constant of at least $1 \times 10^{-5}$, and an organic copper salt and at least one polymerization inhibitor selected from the group consisting of quinones and dihydric phenols.

25. A method of polymerization which comprises polymerizing a polyester obtained by reacting an alcohol having at least two hydroxyl groups capable of ester formation and a compound selected from the group consisting of alpha, beta-ethylenically unsaturated polycarboxylic acids, and the anhydrides thereof with a free radical initiator in the presence of a copper salt and a hydrazine addition salt of an acid selected from the group consisting of organic and inorganic non-oxidizing acids having a dissociation constant of at least $1 \times 10^{-5}$.

26. A method of polymerization which comprises polymerizing a polyester obtained by reacting a dihydric alcohol with a compound selected from the group consisting of alpha, beta-ethylenically unsaturated dicarboxylic acids and the anhydrides thereof, and an ethylenically unsaturated monomeric compound containing the $>C=CH_2$ group with a free radical initiator in the presence of a copper compound which is soluble in said polyester and said monomeric compound and a hydrazine addition salt of an acid selected from the group consisting of organic and inorganic non-oxidizing acids having a dissociation constant of at least $1 \times 10^{-5}$.

27. The method of claim 26 wherein the hydrazine addition salt is an unsubstituted hydrazine addition salt.

28. A method of controlling the polymerization of polymerizable compositions containing a polyester obtained by reacting an alcohol having at least two hydroxyl groups capable of ester formation and a compound selected from the group consisting of alpha, beta-ethylenically unsaturated polycarboxylic acids and the anhydrides thereof which comprises adding a copper salt and a stabilizing amount of a hydrazine addition salt of an acid selected from the group consisting of organic and inorganic non-oxidizing acids having a dissociation constant of at least $1 \times 10^{-5}$.

29. A method of controlling the polymerization of polymerizable compositions containing a polyester obtained by reacting a dihydric alcohol with a compound selected from the group consisting of alpha, beta-ethylenically unsaturated dicarboxylic acids and the anhydrides thereof, and an ethylenically unsaturated monomeric compound containing the $>C=CH_2$ group, which comprises adding a copper compound which is soluble in said polyester and said monomeric compound and a stabilizing amount of a hydrazine addition salt of an acid selected from the group consisting of organic and inorganic non-oxidizing acids having a dissociation constant of at least $1 \times 10^{-5}$.

30. The method of claim 29 wherein the hydrazine addition salt is an unsubstituted hydrazine addition salt.

31. A composition of matter comprising a polyester obtained by reacting an alcohol having at least two hydroxyl groups capable of ester formation and a compound selected from the group consisting of alpha, beta-ethylenically unsaturated polycarboxylic acids and the anhydrides thereof, a copper salt, and a stabilizing amount of a hydrazine addition salt of an acid selected from the group consisting of organic and inorganic non-oxidizing acids having a dissociation constant of at least $1 \times 10^{-5}$.

32. A composition of matter comprising a polyester obtained by reacting a dihydric alcohol with a compound selected from the group consisting of alpha, beta-ethylenically unsaturated dicarboxylic acids and the anhydrides thereof, an ethylenically unsaturated monomeric compound containing the $>C=CH_2$ group, a copper compound which is soluble in said polyester and said monomeric compound, and a stabilizing amount of a hydrazine addition salt of an acid selected from the group consisting of organic and inorganic non-oxidizing acids having a dissociation constant of at least $1 \times 10^{-5}$.

33. The composition of claim 32 wherein the hydrazine addition salt is an unsubstituted hydrazine addition salt.

34. The composition of claim 32 wherein said copper compound is selected from the group consisting of copper (II) salts of inorganic anions, cupric salts of organic anions, cuprous salts of inorganic anions, cuprous salts of organic anions, neutral complex cupric co-ordination salts, and neutral complex cuprous co-ordination salts.

35. The composition of claim 32 wherein the hydrazine addition salt is a mineral acid salt of hydrazine.

36. The composition of claim 32 wherein the hydrazine addition salt is selected from the group consisting of salts having the formulae:

(I) 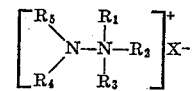

(II) 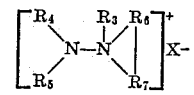

(III) 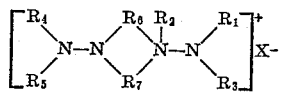

(IV) 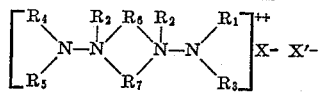

wherein $R_1$ is selected from the group consisting of alkyl, aralkyl, aromatic, and araliphatic radicals; $R_2$, $R_3$, $R_4$ and $R_5$ are selected from the group consisting of hydrogen, alkyl, aralkyl, aromatic, aliphatic, and araliphatic radicals; $R_6$ and $R_7$ are selected from the group consisting of alkylene and substituted alkylene radicals; and X and X⁻ are anionic radicals selected from the group consisting of organic and inorganic non-oxidizing acids having a dissociation constant of at least $1 \times 10^{-5}$.

References Cited by the Examiner
UNITED STATES PATENTS 2,570,269   10/51   Parker    260—666.5
2,727,879   12/55   Vincent    260—45.75
2,790,734   4/57   Kuhn et al.    260—45.75

FOREIGN PATENTS 883,650   7/53   Germany.

WILLIAM H. SHORT, *Primary Examiner.*

LEON J. BERCOVITZ, *Examiner.*